(12) United States Patent
Keegan

(10) Patent No.: US 8,781,039 B2
(45) Date of Patent: Jul. 15, 2014

(54) RECEIVER AND METHOD FOR RECEIVING A COMPOSITE SIGNAL

(71) Applicant: Deere & Company, Moline, IL (US)

(72) Inventor: Richard G. Keegan, Palos Verdes Estates, CA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 13/718,793

(22) Filed: Dec. 18, 2012

(65) Prior Publication Data

US 2014/0119480 A1     May 1, 2014

Related U.S. Application Data

(60) Provisional application No. 61/718,983, filed on Oct. 26, 2012.

(51) Int. Cl.
*H04L 27/06* (2006.01)
(52) U.S. Cl.
USPC .......................................... 375/343
(58) Field of Classification Search
CPC ............... H04B 2201/70715; H04B 1/7075; H04B 1/707; H04B 1/7085; H04B 1/709
USPC .......................... 375/142, 150, 343
See application file for complete search history.

(56) References Cited

U.S. PATENT DOCUMENTS

| | | |
|---|---|---|
| 3,922,496 A | 11/1975 | Gabbard et al. |
| 4,914,735 A | 4/1990 | Ichiyoshi |
| 5,729,570 A | 3/1998 | Magill |
| 6,097,762 A | 8/2000 | Suzuki et al. |
| 6,359,504 B1 | 3/2002 | Cozzarelli |
| 7,043,271 B1 | 5/2006 | Seto et al. |
| 7,120,198 B1 | 10/2006 | Dafesh et al. |
| 7,346,918 B2 | 3/2008 | Hennenhoefer et al. |

(Continued)

FOREIGN PATENT DOCUMENTS

| | | |
|---|---|---|
| EP | 1672364 A2 | 6/2006 |
| EP | 1664827 B1 | 8/2007 |

(Continued)

OTHER PUBLICATIONS

Dovis, Fabio; Presti, Letizia Lo; Fantino. Maurizio; Mulassano. Paolo; Godet, Jeremie, Comparison between Galileo CBOC Candidates and BOC (1,1) in Terms of Detection Performance. International Journal of Navigation and Observation, vol. 2008, Article ID 793868.

(Continued)

*Primary Examiner* — Don N Vo

(57) ABSTRACT

A first signal generator is arranged to generate a first signal. A data storage device is configured to provide a null code. A multiplexer is capable of multiplexing the first signal and the null code consistent with a predetermined time sequence for expression of the null code in a produced precursor signal. A ranging code generator is arranged for generating a ranging code. A mixer is capable of accepting the ranging code and the precursor signal and outputting a locally generated reference signal. After down-conversion and digitization of the received composite signal, the code correlator can correlate the digital received composite signal to the locally generated reference signal to decode at least a first portion of the received composite signal, while leaving a second portion of the received composite signal undecoded.

27 Claims, 4 Drawing Sheets

(56) References Cited

U.S. PATENT DOCUMENTS

| | | | |
|---|---|---|---|
| 7,418,043 | B2 | 8/2008 | Shattil |
| 7,464,696 | B2 | 12/2008 | Furusawa et al. |
| 7,471,241 | B1* | 12/2008 | Yang ................ 342/357.73 |
| 8,233,518 | B2 | 7/2012 | Pratt et al. |
| 2004/0165652 | A1 | 8/2004 | Schilling et al. |
| 2005/0281325 | A1* | 12/2005 | Lillo et al. ................ 375/150 |
| 2007/0176676 | A1 | 8/2007 | Pratt et al. |
| 2007/0274374 | A1* | 11/2007 | Abraham ................ 375/148 |
| 2008/0260001 | A1 | 10/2008 | Betz et al. |
| 2010/0284440 | A1 | 11/2010 | Betz et al. |
| 2011/0068958 | A1* | 3/2011 | Knight et al. ................ 341/51 |
| 2011/0309978 | A1* | 12/2011 | Matsumoto ............ 342/357.77 |

FOREIGN PATENT DOCUMENTS

| | | |
|---|---|---|
| EP | 1830199 B1 | 2/2012 |
| GB | 2456867 B | 10/2011 |
| JP | 008130563 A | 5/1996 |
| JP | 2007504731 A | 10/2007 |
| JP | 2008032737 A | 2/2008 |
| WO | 2005011131 A2 | 2/2005 |

OTHER PUBLICATIONS

Hein, Guenter W.; Avila-Rodriguez, Jose-Angel; Wallner, Stefan; Pratt, Anthony R.; Owen, John; Issler, Jean-Luc; Betz, John W.; Hegarty, Chris J.; Lenahan, Lt Sean; Rushanan, Joseph J.; Kraay, Andrea L.: Stansell. Thomas A.; MBOC: The New 0ptimized Spreading Modulation Recommended for Galileo L1 OS and GPS L1C. 2006.

Stansell, Tom; Fenton, Pat; Garin, Lionel; Hatch, Ron; Knight, Jerry; Rowitch, Doug; Sheynblat, Len; Stratton, Alex; Studenny, John; Weill, Larry; BOC or MBOC? The Common GPS/Galileo Civil Signal Design: A Manufacturers Dialog. Part 1. 2006. InsideGNSS. Jul./Aug. 2006.

Lohan, Elena Simona; Renfors, Markku; Correlation properties of Multiplexed Binary Offset Carrier (MBOC) modulation. Institute of Communications Engineering, Tampere University of Technology, FIN-33101, Finland. published at European Wireless Conference, Apr. 1, 2007, Pons, France.

Slimane, S. Ben; Le-Ngoc, T.; Bandwidth Efficient Differential Phase Shift Keying (PSK) Techniques for TDMA Applications, Concordia University Electrical and Computer Engineering Department. Montreal, Quebec, Canada. published in WESCANEX 88:Digital Communications Conference Proceedings, May 1996, Saskatoon, Canada.

Pratt, Anthony R.; Owen, John I.R.; Hein Guenter W.; Avila-Rodriguez, Jose A.; Tracking Complex Modulation Waveforms—How to Avoid Receiver Bias. Ively Road, Farnborough, GU 14 OLA, United Kingdom, University FAF Munich, Werner-Heisenberg-Weg 39, Neubiberg, 85577, Germany. (Published by IEEE, 2006).

Pratt, Anthony R.; Owen, John I.R.; Hein Guenter W.; Avila-Rodriguez, Jose A.; Controlling the Galileo L1 OS Signal Emissions with sateilite Baseband Filters. Ively Road, Farnborough, GU 14 OLA, United Kingdom. (Published by IEEE, 2006).

Soeliner, M.; Erhard, PH.; Comparison of AWGN Code Tracking Accuracy for Alternative-BOC, Complex-LOC and Complex-BOC Modulation Options in Galileo E5-Band. System-Engineer Navigation, Astrium Germany, Ottobrunn, European Space Agency. (Published in the ENC GNSS 2003, Graz, Austria).

Global Positioning System Directorate Systems Engineering & Integration Interface Specification IS-GSP-800, Naystar GPS Space Segment/User Segment L1C Interface, publication IS-GPS-800, dated Sep. 21, 2011, available on-line at http://www.gps.gov/technical/icwg/#is-gps-800.

* cited by examiner

US 8,781,039 B2

RECEIVER AND METHOD FOR RECEIVING A COMPOSITE SIGNAL

This document (including the drawings) claims priority and the benefit of the filing date based on U.S. provisional application No. 61/718,983, filed Oct. 26, 2012 under 35 U.S.C. §119 (e), where the provisional application is hereby incorporated by reference herein.

FIELD OF THE DISCLOSURE

This disclosure relates to a receiver and method for receiving a composite signal.

BACKGROUND

A transmitter of a navigation satellite might transmit a composite signal, such as a multiplexed binary offset carrier signal. In certain prior art, a complex receiver may be required to decode fully the multiplexed binary offset carrier signal. For example, the receiver may need knowledge of the carrier frequency or suppressed carrier frequency of each binary offset carrier component to form a local replica of the multiplexed binary offset carrier signal at the receiver. Thus, there is a need for a simpler receiver that uses less circuitry, consumes less energy, or is less expensive than that required for decoding fully the composite signal or the multiplexed binary offset signal.

SUMMARY

In accordance with one embodiment, a receiver for receiving a composite signal (e.g., binary offset carrier signal) is capable of at least partially decoding the received composite signal. A receiver front-end is configured for down-converting a received composite signal. An analog-to-digital converter is capable of converting the received composite signal to a digital received composite signal. A first signal generator is arranged to generate a first signal. A data storage device is configured to provide a null code. A multiplexer is capable of multiplexing the first signal and the null code consistent with a predetermined time sequence for expression of the null code in a produced precursor signal. A ranging code generator is arranged for generating a ranging code. A mixer is capable of accepting the ranging code and the precursor signal and outputting a locally generated reference signal. A code correlator can correlate the digital received composite signal to the locally generated reference signal to decode at least a first portion of the received composite signal, while leaving a second portion of the received composite signal undecoded. A tracking loop signal processor can process the locally generated reference signal with respect to the digital received composite signal via a time delay module to maximize correlation of the received composite signal to the locally generated reference signal.

DESCRIPTION OF THE PREFERRED EMBODIMENT

Figure 1:
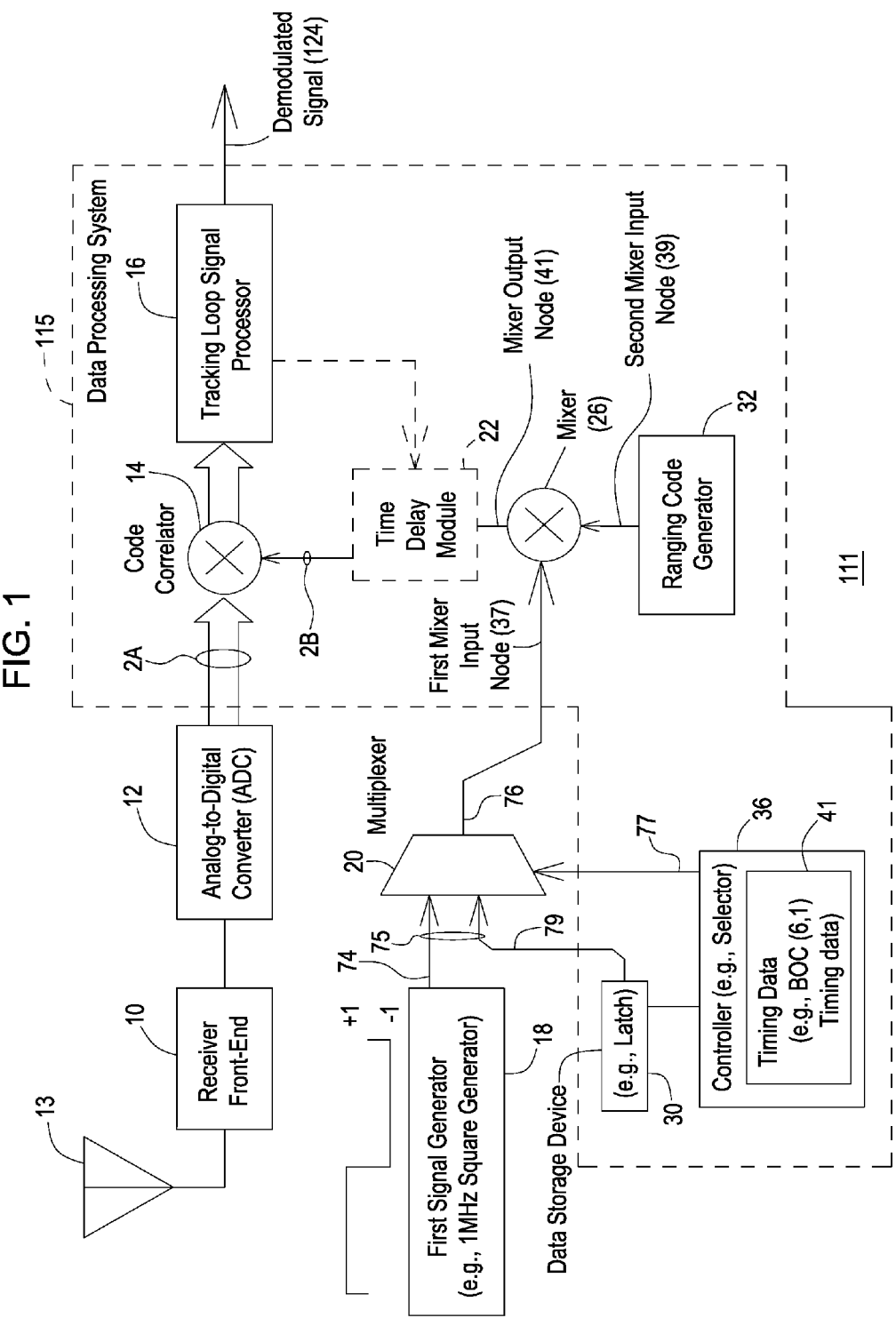
FIG. 1 is a block diagram of one embodiment of a receiver for receiving a composite signal.

In accordance with one embodiment, FIG. 1 shows a receiver 111 for receiving a composite signal, where the receiver is capable of at least partially decoding a received composite signal that is received at antenna 13. In one embodiment, the received composite signal is transmitted from a satellite, such as a navigation satellite, or such as a Galileo-compatible navigation satellite or a Global Positioning System (GPS) satellite. In one embodiment, the received composite signal refers to a first binary offset carrier signal that is multiplexed with a second binary offset carrier signal, where the first binary offset carrier signal comprises a first modulating subcarrier signal ($f_m$) (e.g., a square wave, sine wave, or cosine wave) multiplied by a secondary modulating signal or a ranging code signal ($f_n$) (e.g. pseudo-random noise ranging signal or pseudo-noise signal) that is equal to or greater than a chip rate of spread spectrum signal. Similarly, the second binary offset carrier signal comprises a second modulating subcarrier signal ($f_o$) (e.g., a square wave, sine wave, or cosine wave) multiplied by the secondary modulating signal or the ranging code signal ($f_p$) (e.g., where $f_n$ is set equal to $f_p$).

As used in this document, a binary offset carrier (BOC) signal may comprise a sine BOC signal (sin BOC), a cosine BOC signal (cos BOC), multiplexed binary offset carrier (MBOC), a time-division multiplexed BOC signal, an alternative BOC signal, a double BOC signal, a composite binary offset carrier signal, an L1C signal of a GPS system, or other variants. Certain BOC signals (e.g., BOC or sin BOC) can be represented as BOC (m,n) where m is $f_m/f_c$ and n is $f_n/f_c$, $f_m$ is a first subcarrier frequency, $f_n$ is the actual chip frequency, and $f_c$ is the reference chip frequency. Similarly, BOC signals (e.g., BOC or sin BOC) can be represented as BOC (o,p) where o is $f_o/f_c$ and p is $f_p/f_c$, $f_o$ is a first subcarrier frequency, $f_p$ is the actual chip frequency, and $f_c$ is the reference chip frequency. In one example, $f_c$ may be set to 1.023 Megahertz (MHZ) or the reference course acquisition code (C/A code) reference signal of the GPS system.

The power spectral density of an illustrative square-wave modulated MBOC signal may be represented by the following equation:

$$G_{MBOC}\left(o, p, \frac{z}{y}\right)(f) = \frac{x}{y}G_{BOC(m,n)}(f) + \frac{z}{y}G_{BOC(o,p)}(f),$$

where
x is an integer greater than z, y is an integer and common denominator, the indices m, n, o and p are defined above, In one example, x/y approximately equals 10/11 and z/y approximately equals 1/11, such that a majority of the power spectral density is associated with the lower frequency $G_{BOC(m,n)}$ component, rather than the higher frequency $G_{BOC(o,p)}$ component.

The power spectral density of an illustrative square-wave modulated (6,1,z/y) MBOC signal may be represented by the following equation:

$$G_{BOC}\left(6, 1, \frac{z}{y}\right)(f) = \frac{x}{y}G_{BOC(1,1)}(f) + \frac{z}{y}G_{BOC(6,1)}(f),$$

where
x is an integer greater than z, y is an integer and common denominator, the indices m, n, o and p are defined above, In one example, x/y approximately equals 10/11 and z/y approximately equals 1/11, such that a majority of the power spectral density is associated with the lower frequency $G_{BOC(1,1)}$ component, rather than the higher frequency $G_{BOC(6,1)}$ component.

For a sine-wave modulated MOBC signal, the power spectral density of an illustrative MBOC signal may be represented by the following equations:

$$G_{MBOC}\left(6, 1, \frac{x}{y}\right)(f) = \frac{x}{y} G_{SinBOC(1,1)}(f) + \frac{z}{y} G_{SinBOC(6,1)}(f),$$

where $$G_{SinBOC(m,n)}(f) = \frac{1}{T_c}\left(\frac{\sin\left(\pi f \frac{T_C}{N_B}\right)\sin(\pi f T_C)}{\pi \cos\left(\pi f \frac{T_C}{N_B}\right)}\right)^2, \text{ where}$$

x is an integer greater than z, y is an integer and common denominator, the indices m, n are defined above, $N_B$ is the BOC modulation index or $N_B$ equals 2 m/n, and $T_c$ is the actual chip rate (e.g., of the second subcarrier signal). In one example, x/y approximately equals 10/11 and z/y approximately equals 1/11, such that a majority of the power spectral density is associated with the lower frequency $G_{Sin\ BOC(1,1)}$ component, rather than the higher frequency $G_{Sin\ BOC(6,1)}$ component.

In one embodiment, a receiver front end 10 is coupled to an analog-to-digital converter 12. In turn, the analog-to-digital converter 12 communicates with a code correlator 14. A first signal generator 18 and a data storage device 30 (e.g., latch) are coupled to multiplexer inputs 75 (e.g., input ports) of a multiplexer 20. A multiplexer output 76 (e.g., an output port) of the multiplexer 20 and a ranging code generator 32 are coupled to a mixer 26. In turn, the mixer 26 is coupled to the code correlator 14, either directly or indirectly via an optional time delay module 22. The time delay module 22 is shown in dashed lines because it is optional and may be deleted if the tracking loop signal processor 16 and the code correlator 14 are configured to obviate the need for the time delay module 22. The code correlator 14 communicates with a tracking loop signal processor or tracking look signal processing system 16. If the time delay module 22 is used, the code correlator 14 is capable of communicating with the time delay module 22.

A receiver front-end 10 is coupled to an antenna 13 for receiving a composite signal (i.e., received composite signal), a microwave signal, a radio frequency signal, or another electromagnetic signal, such as a spread-spectrum signal or a code division multiple access signal transmitted by a navigation satellite. A receiver front-end 10 is configured for downconverting the received composite signal to a baseband signal or an intermediate frequency signal. An analog-to-digital converter 12 is capable of converting the down-converted signal (e.g., analog baseband signal or analog intermediate frequency signal) to a digital composite signal.

A first signal generator 18 is arranged to generate a first signal (e.g., a first modulating signal or a first subcarrier) at one multiplexer input 75 (e.g., an input port). A data storage device 30 (e.g., latch) is configured to provide null code to another multiplexer input 75 (e.g., an input port). A multiplexer 20 is capable of multiplexing the first signal and the null code consistent with a predetermined time sequence for expression of the null code in a produced precursor signal. In one embodiment, the precursor signal refers to a multiplexed modulating signal formed from a single BOC input signal (e.g., first BOC signal) with inserted time slots of null codes or null code symbols in accordance with only timing data 41 associated with a secondary BOC signal (e.g., second BOC signal), where the timing data 41 does not contain any modulated data content of the secondary BOC signal. For example, modulated data content of the secondary BOC signal means a modulated square wave pulse train, possibly of in-phase or anti-phase constituents, at a second square wave frequency different (e.g., higher or lower) than the first frequency of the signal BOC input signal.

A controller 36 provides the timing data 41 or predetermined time sequence to a control port 77 of the multiplexer 20. The multiplexer 20 outputs the precursor signal at the multiplexer output 76, which is coupled to the first mixer input node 37 as shown in FIG. 1. A ranging code generator 32 is arranged for generating a ranging code at the second mixer input node 39. For example, the ranging code signal may comprise a secondary modulating signal, a pseudo-random noise code, or pseudo noise signal. In one embodiment, the ranging code signal spreads the first signal over a target spectrum or frequency band. The ranging code of the receiver 111 is identical or substantially similar to the ranging code transmitted by the transmitter or transceiver of one or more satellites.

In one embodiment, a mixer 26 is capable of accepting the ranging code and the precursor signal and outputting a locally generated reference signal (e.g., a spread modulating signal) at a mixer output node 41. A code correlator 14 can correlate the digital received composite signal (e.g., after downconversion by receiver front end 10 and digitization by the analog-to-digital converter 12) to the locally generated reference signal to decode at least a first portion of the received composite signal, while leaving a second portion of the received composite signal undecoded. For example, the first portion of the received signal, which is decoded, may refer to a first BOC signal within a multiplexed BOC signal, whereas the second portion may refer to a second BOC signal within the multiplexed BOC signal. In one embodiment, the first portion is assigned a lesser number of time slots in received composite signal than the second portion is assigned.

A tracking loop signal processor 16 is arranged for processing the locally generated reference signal with respect to the digital received composite signal to maximize correlation of the received composite signal to the locally generated reference signal. For example, a tracking loop signal processor 16 can shift an adjustable time delay, or engage in other data processing of one or more digital signals associated with the locally generated reference signal with respect to the received digital composite signal (e.g., direct path signal transmitted by a satellite or one or more multipath signals resulting from a satellite transmission) via a time delay module 22 to maximize correlation of the received composite signal to the locally generated reference signal.

The tracking loop signal processor 16 outputs a demodulated signal 124, such as a demodulated digital signal with a quadrature phase component and in-phase component at baseband.

In another configuration, the demodulated signal 124 may comprise a demodulated pilot component of an L1C carrier signal of a GPS-compliant satellite transmission. The demodulated pilot component may be a preliminary step in decoding a related data component that modulates the composite signal, for example. Alternatively, the demodulated pilot component may be a preliminary step in detecting a carrier phase or resolving a carrier phase ambiguity of the composite signal (e.g., L1C). The demodulated digital signal 124 (along with similar demodulated signals received from other satellites) may be used to estimate a position (e.g., geographic coordinates in two or three dimensions), velocity, or acceleration of the receiver, or the attitude (e.g., tilt angle, roll angle, or yaw angle (heading)) of the receiver.

In one embodiment, the receiver front end 10 may comprise one or more of the following elements: an amplifier or preamplifier coupled to the antenna 13, an amplifier or preamplifier for amplifying a received radio frequency or microwave signal that is transmitted by a navigation satellite transmitter, a local oscillator, a frequency adjustable local oscillator, an intermediate frequency amplifier, mixer, and a downconverter. For example, the downconverter may comprise the combination of a mixer and the local oscillator to multiply or mix the received composite signal at a transmitted frequency with a local oscillator at the transmitted frequency or lower frequency to downconvert the received composite signal to an analog intermediate frequency signal or an analog baseband signal.

In an alternate embodiment, the receiver front end 10 may have multiple down-converters in series or successive stages, where the first downconverter stage downconverts the received composite signal to an intermediate frequency analog signal and where the last stage downconverts the intermediate frequency analog signal to a baseband analog signal.

In one configuration, the analog-to-digital converter 12 is capable of converting the intermediate frequency analog signal or the baseband analog signal to a digital intermediate frequency signal or a digital baseband signal. The analog-to-digital converter 12 has sufficient processing throughput and adequate response times to provide real-time output of digital signals for processing by the receiver 111.

In one embodiment, a data processing system 115 comprises a combination of one or more of the following: the code correlator 14, the tracking loop signal processor 16, the time delay module 22, the data storage device 30, and the controller 36. The data processing system 115 may comprise hardware and software instructions. For example, in one illustrative embodiment the hardware comprises a computer or a data processor that communicates to a data storage device, which stores software instructions, via one or more data buses. The data processor may comprise one or more of the following: an electronic data processor, a microprocessor, a microcontroller, an application specific integrated circuit (ASIC), digital signal processor (DSP), a programmable logic device, an arithmetic logic unit, or another electronic data processing device. The data storage device may comprise electronic memory, volatile electronic memory, a magnetic storage device, an optical storage device, or any other device for storing data.

The first signal generator 18 may comprise an oscillator circuit or a precision oscillator circuit that is capable of generating one or more of the following: a square wave, a sinusoidal wave, a rectangular waveform, a triangular waveform, a pulse train, bipolar phase shift keying, or another first signal. For example, in one embodiment the oscillator may comprise a phase locked loop circuit. In another embodiment, the oscillator circuit is associated with a highly stable and accurate clock signal to generate a first signal at a first frequency with precision and a maximum known tolerance or deviation from the first frequency.

In one embodiment, the data storage device 30 comprises one or more of the following: a latch, a register, a flip-flop, electronic memory, or nonvolatile electronic memory. The controller 36 may control the output of the data storage device 30. For example, the controller 36 may control set, reset, write, read, or other commands of the data storage device 30, the multiplexer 20, or both. Further, the controller 36 may control operational modes or states of the data storage device 30, the multiplexer 20, or both in coordination with a clock signal. In one embodiment, the controller 36 manages, stores, retrieves, or accesses timing data 41 associated with the predetermined sequence of the composite signal, where the predetermined sequence defines time slots for the insertion of non-dominant signal components (e.g., BOC (6,1) or second portion of the received composite signal) into composite signal (e.g., MBOC), where the dominant signal component (e.g., BOC (1,1) signal component or first portion of the received composite signal) has a majority of the spectral density.

In one configuration, the multiplexer 20 comprises a time division multiplexer that has at least two multiplexer inputs 75, a multiplexer output 76 and a control input 77. The controller 36 is coupled to the control input 77. The controller 36 stores, retrieves or accesses timing data 41 associated with a component signal (e.g., nondominant component signal, such as BOC (6,1) signal component of a MBOC signal) of the received composite signal. For each time slot of the multiplexer output signal, the controller 36 is adapted to determine the multiplexer output signal at the multiplexer output 76 from the selection of the input signals (e.g., first signal or the null code or null code symbols) applied to the first multiplexer input 74 or the second multiplexer input 79 consistent with the timing data 41.

The multiplexer 20 is capable of multiplexing square wave signals, sinusoidal wave signals, Manchester-encoded signals, logic level signals (e.g., transistor-to-transistor logic level (TTL) or complementary metal-oxide semiconductor logic levels), or otherwise. The multiplexer 20 is capable of multiplexing the first signal and the null code of the data storage device 30 consistent with the timing data 41 or a predetermined time sequence for expression of the null code in a produced precursor signal at the multiplexer output 76.

In alternate embodiments, a frequency division multiplexer may be used to form a precursor of a local replica signal where similar frequency division multiplexing was used at a transmitter that transmits the composite signal.

In one embodiment, the ranging code generator 32 may comprise any generator for generating a spread spectrum code, spread spectrum sequence, binary sequences, Gold codes, pseudo-random noise code or a pseudo-random noise code sequence that is similar to a spread spectrum code, spread spectrum sequence, binary sequences, Gold codes, pseudo-random noise code or a pseudo-random noise code sequence transmitted by a transmitter of a satellite for reception by the receiver 111 as the composite signal. In another embodiment, the ranging code generator 32 may be formed of series of shift registers that are loaded with an initial starting code sequence, where the shift registers have various selectable or controllable taps for providing feedback and reiterative values as the output.

In one embodiment, the code correlator 14 correlates the digital received composite signal to the locally generated reference signal to decode at least a first portion (e.g., dominant portion of the composite signal) of the received composite signal, while leaving a second portion (e.g., non-dominant portion of the composite signal) of the received composite signal undecoded. The first portion of the received composite signal may comprise a first binary offset carrier signal component (e.g., BOC(1,1) or a dominant signal component characterized by a greater level of its spectral density compared to other signal components of the composite signal), whereas the second portion of the received composite signal may comprise a second binary offset carrier signal component (e.g., BOC (6,1) or a non-dominant signal component characterized by a lower level of its spectral density compared to other signal components of the composite signal). In one example, the code correlator 14 does not demodulate the second binary offset carrier signal component (or second portion of the received composite signal) where the first binary offset carrier signal component (or first portion of the received composite signal) comprises the locally generated reference signal that is inputted into the code correlator 14. Accordingly, because the second binary offset carrier signal component or the second portion of the received composite signal is not fully demodulated, the receiver operates with some minimal or tolerable degradation (e.g., approximately 0.8 decibel (dB) degradation for certain configurations) in the signal-to-noise ratio of the received composite signal.

Figure 2:
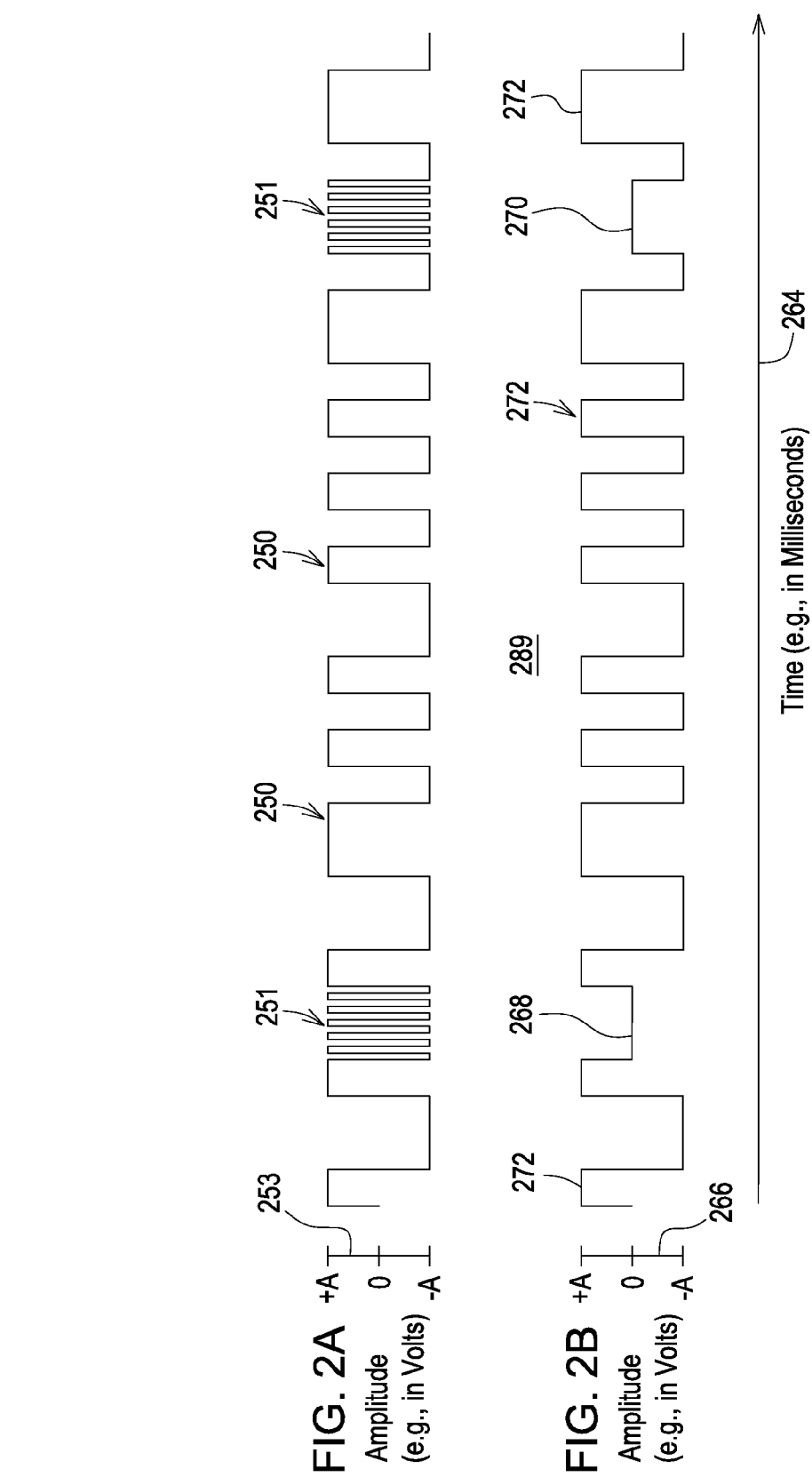
FIG. 2A is a diagram of an illustrative baseband representation of the received composite signal.
FIG. 2B is a diagram of an illustrative baseband representation of the locally generated reference signal.

FIG. 2A illustrates one possible representation of the digital baseband composite signal, or its equivalent that modules the digital intermediate frequency composite signal. For example, the composite signal of FIG. 2A may comprise a TMBOC or BOC signal that is outputted by the analog-to-digital converter at node 2A in FIG. 1, inputted at the code correlator 14 at node 2A in FIG. 1, or both. FIG. 2A shows the modulating signal in its spread form provided by the multiplication of the first signal by the ranging code signal. The modulating signal is applied to the correlator 14 at node 2A in its spread form. The vertical axis 253 of FIG. 2A shows an amplitude of the signal (e.g., in Volts), whereas the common horizontal axis 264 of FIG. 2A and FIG. 2B show elapsed time (e.g., in milliseconds). As illustrated the composite signal may comprise a Manchester coded, square wave signal that varies between an amplitude of +A and −A.

In one configuration, the composite signal of FIG. 2A may be formed by a satellite transmitter that multiplexes a first binary offset carrier signal component (BOC (n,m) signal) and a second binary offset carrier signal component (BOC(o, p) signal), where n, m, o and p are integer values, m is $f_m/f_c$, n is $f_n/f_c$, $f_m$ is a first subcarrier frequency, $f_n$ is the actual chip frequency, and $f_c$ is the reference chip frequency, o is $f_o/f_c$, p is $f_p/f_c$, $f_o$ is a second subcarrier frequency, $f_p$ is the actual chip frequency and $f_c$ is the reference chip frequency, where the second binary offset carrier signal component has a higher frequency component than the first binary offset carrier signal component and wherein the third binary offset carrier signal component has a higher frequency component than the first binary offset carrier signal component. The first binary offset carrier signal component (e.g., BOC(n,m)) is illustrated at reference numbers 250, whereas the second binary offset carrier signal component (e.g., BOC(o,p)) is illustrated at reference numbers 251.

FIG. 2B illustrates one possible representation of the locally generated reference signal 289 that is at baseband or the same intermediate frequency as the output of the receiver front end 10. For example, the locally generated reference signal may comprise a signal that appears at the mixer output node 41 or at reference node 2B in FIG. 1. FIG. 2B shows the modulating signal in its spread form provided by the multiplication of the first signal by the ranging code signal. The modulating signal is applied to the correlator 14 at node 2B in its spread form to properly decode the received composite signal. The vertical axis 266 of FIG. 2B shows an amplitude of the signal (e.g., in Volts), whereas the common horizontal axis 264 of FIG. 2A and FIG. 2B show elapsed time (e.g., in milliseconds).

As illustrated the locally generated reference signal 289 may comprise a generally Manchester coded, square wave signal that varies between an amplitude of +A and −A, except that the signal portions (268, 270) or time windows when the null code is inserted the locally generated reference signal 289 differs from a standard Manchester encoded signal. The standard Manchester encoded signal indicates a first logic level by a high-to-low transition and a second logic level by a low-to-high transition, where the signal has no direct current (DC) component, such as the null code logic level. In one embodiment, at the mixer output node 41 the locally generated reference signal has a direct current component at signal portions (268, 270) which does not agree with the received composite signal presented at the other input to the correlator 14. However, the receiver performance (e.g., signal-to-noise ratio of the receiver 111) is better than merely presenting the dominant component (e.g., BOC(1,1) signal component) of the composite signal during signal portions (268, 270).

The absence of the dominant signal component 272 (e.g., BOC(1,1)) of the composite signal (e.g., for certain time slots in which the BOC (6,1) is active or expressed), and the dominant signal component's replacement by the null code for active time slots of the non-dominant signal component (e.g., BOC (6,1)) in accordance with the timing data 41 or predetermined sequence may reduce the noise (signal noise) that would otherwise be associated with the dominant signal component. Advantageously, the noise associated with direct current (e.g., approximately zero Hertz) is more readily removed and filtered than the noise associated with the first signal or the dominant signal component (e.g., BOC(1,1)). For example, the BOC (1,1) signal may be modulated at 1 MHz that can interpreted as higher frequency noise during the time slots of the non-dominant signal component of the received composite signal, whereas lower frequency or DC noise can be removed with a low-pass filter with high attenuation.

In one embodiment, all or a substantial majority of the time slots are associated with the first signal (e.g., from first signal generator 18) or dominant signal component 272. The first binary offset carrier signal component (e.g., BOC(n,m)) is illustrated at reference numbers 260, whereas the second binary offset carrier signal component (e.g., BOC(o,p)) is not shown or substantially present in the locally generated reference signal of FIG. 2B.

Figure 3:
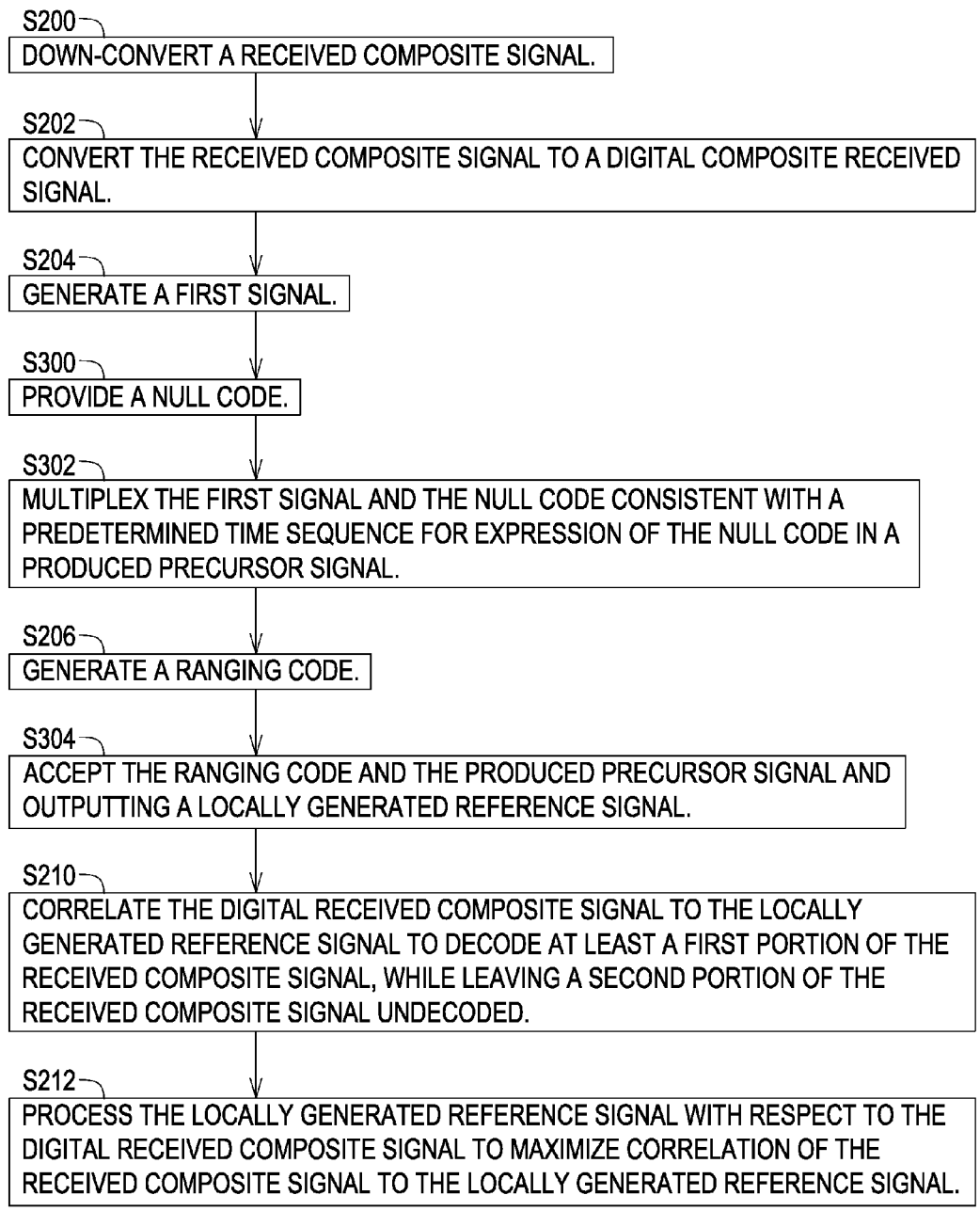
FIG. 3 is a flow chart of one embodiment of a method for receiving a composite signal.

FIG. 3 illustrates one embodiment of a method for receiving a binary offset carrier signal. The method of FIG. 3 begins in step S200.

In step S200, a receiver 111, a receiver front end 10 or downconverter downconverts a received composite signal (e.g., multiplexed binary offset carrier signal). For example, the receiver front end 10 downconverts a received signal that is transmitted from a satellite to an intermediate frequency signal or a baseband signal.

In step S202, a receiver 111, an analog-to-digital converter 12 (ADC) or converter converts the received composite signal or the analog down-converted signal to a digital composite signal. For example, the analog-to-digital converter 12 converts the analog intermediate frequency signal or an analog baseband signal outputted by the receiver front end 10 to a digital intermediate frequency signal or a digital baseband signal that can be processed in the digital domain (e.g., in the time domain via Fast Fourier transforms, Z-transforms or otherwise) by a data processor or the data processing system 115.

In step S204, a first signal generator 18 generates a first signal (e.g., a square wave signal at a first frequency). Step S204 may be executed in accordance with various techniques that may be applied separately or cumulatively. Under a first technique, the first signal generates a first signal that is a precursor of a component of the locally generated reference signal, or a first signal that is a precursor of a dominant component of the composite signal (e.g., multiplexed binary offset carrier signal). Under a second technique, if the received composite signal comprises a multiplexed binary offset carrier (MBOC) or a time multiplexed binary offset carrier (TMBOC) signal, the first signal comprises a signal precursor of a binary offset carrier (BOC) signal component of the MBOC or TMBOC signal. Under a third technique, if the received composite signal comprises a multiplexed binary offset carrier (MBOC) signal composed of a binary offset carrier (BOC) (1,1) signal component, and a BOC (6,1) signal component, the first signal comprises a signal precursor (e.g., first subcarrier or first modulating signal, prior to spreading) of a BOC (1,1) signal. Under a fourth technique, the generating of the first signal comprises the generating of a first square wave signal at a first frequency. Under a fifth technique, the generating of the first signal comprises the generating of a sinusoidal signal composed of a Sin BOC (1,1) signal precursor.

In step S300, the receiver 111, the data processing system 115, or a data storage device 30 provides a null code or null code symbols. For example, a controller 36 sets the null code as the output of the data storage device 30 for a time period commensurate with a refresh time period for refreshing or revalidating the value of the null code (e.g., a certain maximum number of clock cycles or the expiration of the timer).

In step S302, the receiver 111 or the multiplexer 20 multiplexes the first signal and the null code consistent with the timing data 41 or a predetermined time sequence for expression of the null code in a produced precursor signal (e.g., at the multiplexer output 76). For example, the receiver 111 or the multiplexer 20 multiplexes the first signal (e.g., BOC(1,1) precursor at multiplexer input 77) and the null code (e.g., direct current level at multiplexer input 74) for time slots or durations consistent with the timing data 41 or a predetermined time sequence for expression of the null code in a produced precursor signal at the multiplexer output 76. In one embodiment, the controller 36 can control the multiplexer 20 to insert the null codes in the proper time slots of the locally generated reference signal consistent with the timing data 41, but regardless of any data content of the non-dominant component signal from which the timing data 41 is derived. The controller 36 manages, stores, retrieves and accesses the timing data 36 or predetermined time sequence, which depends upon the signal components of the composite signal. The first signal is associated with the dominant signal component (e.g., BOC (1,1) component signal or its precursor) of the composite signal, whereas timing of the null code in the locally generated reference signal is associated with (or derived from) the non-dominant signal component (e.g., BOC(6,1) component signal or its precursor) of the composite signal.

The dominant signal component of the composite signal has greater spectral density than the non-dominant signal component. In one embodiment, the dominant signal component occupies more time slots of the composite signal than the non-dominant signal component. The timing data 41 may comprise or relate to assigned time slots of the dominant signal component, the non-dominant signal component, or both in the composite signal.

In step S206, the receiver 111 or the ranging code generator 32 generates a ranging code. For example, the ranging code may comprise a pseudo-random noise code, or a pseudo noise code at a chipping rate or chipping frequency. At the satellite transmitter that transmits the composite signal, the composite signal can be modulated with substantially the same ranging code, such that the receiver 11 can recover the pilot code modulation or any data (e.g., navigation code) modulated on the composite signal, or any carrier phase information that supports estimating a receiver position with respect to one or more satellites.

In step S304, the receiver 111 or the mixer 26 accepts the ranging code and the precursor signal (e.g., at the multiplexer output 76) and outputs a locally generated reference signal. Step S304 may be executed in accordance with various examples that may be applied individually or cumulatively. In a first example for executing step S304, if the composite signal comprises a multiplexed binary offset carrier (MBOC) signal composed of a binary offset carrier (BOC) (1,1) signal component, and a BOC (6,1) signal component, then the locally generated reference signal comprises a BOC (1,1) signal with null codes inserted in accordance with the timing data 41 or the predetermined sequence.

In a second example for executing step S304, if the received composite signal comprises a multiplexed binary offset carrier (MBOC) signal, where a first portion of the received composite signal comprises a first binary offset carrier (BOC) (n,m) signal component, where a second portion of the received composite signal comprises a second binary offset carrier (BOC) (o,p) signal component, where n, m, and p are integer values, and where the locally generated reference signal is associated with the first BOC (n,m) signal component that is temporally dominant in a majority of the time slots of the MBOC signal, then the locally generated reference signal comprises a first BOC(n,m) signal with null codes inserted in accordance with the timing data 41 or the predetermined sequence.

In a third example for executing step S304, if the composite signal comprises a multiplexed binary offset carrier (MBOC) signal composed of a binary offset carrier (BOC) (1,1) signal component, and a BOC (6,1) signal component, then the locally generated reference signal comprises a BOC (1,1) signal with null codes inserted in accordance with the timing data 41 or the predetermined sequence to replace time slots that were otherwise assigned to the BOC(6,1) signal component.

In a fourth example for executing step S304, if the received composite signal comprises a multiplexed binary offset carrier (MBOC) signal, where a first portion of the received composite signal comprises a first binary offset carrier (BOC) (n,m) signal component, where a second portion of the received composite signal comprises a second binary offset carrier (BOC) (o,p) signal component, where n, m, and p are integer values, and where the locally generated reference signal is associated with the first BOC (n,m) signal component that is temporally dominant in a majority of the time slots of the MBOC signal, then the locally generated reference signal comprises a first BOC(n,m) signal with null codes inserted in accordance with the timing data 41 or the predetermined sequence to replace time slots that were otherwise assigned to the BOC(o,p) signal component.

In step S210, the receiver 111 or a code correlator 14 correlates the digital received composite signal to the locally generated reference signal to decode at least a first portion of the received composite signal (e.g., dominant signal component), while leaving a second portion (e.g., nondominant signal component) of the received composite signal undecoded. Step S210 may be executed in accordance with various techniques that may be applied separately or cumulatively. Under a first technique, the receiver 111 or code correlator 14 correlates the digital composite signal to the locally generated signal to demodulate the ranging code. Under a second technique, the code correlator 14 correlates the digital composite signal to the locally generated signal to identify edge transitions for tracking the carrier phase of the of the received composite signal.

In step S212, a tracking loop signal processor 16 processes the locally generated reference signal with respect to the digital received composite signal to maximize the correlation of the received composite signal to the locally generated reference signal. For example, the tracking loop signal processor 16 instructs the time delay module 22, shift register or phase shifter to adjust (e.g., dynamically) an adjustable time delay of the locally generated reference signal with respect to the digital received composite signal via a time delay module 22 to maximize correlation of the received composite signal to the locally generated reference signal.

In one embodiment, the receiver (e.g., 11) of a satellite navigation system, such as the Global Positioning System (GPS), may use an L1C signal that is modulated with a time multiplexed binary offset carrier TMBOC (6,1,4/33) Pilot component at an L1 carrier frequency (e.g., 1575.42 MHz). The composite signal may comprise the L1C signal. The L1C signal comprises two components, the Data component and the Pilot component. The Data component only contains a minority (e.g., approximately 25%) of the total power spectral density of the L1C signal while the Pilot component contains a majority (e.g., the remaining 75%) of the total power spectral density of the L1C signal.

The Data component is binary offset carrier BOC (1,1) signal modulated by a modulating signal that comprises CNAV data bits, where the modulating signal is multiplied by a data-component pseudo-noise (PN) code. Accordingly, the Data component is a BOC (1,1) signal modulated by message data (e.g., CNAV data bits) and a data-component PN code. CNAV data bits include information related to time, clock, status, ephemeris and almanac data related to one or more satellites of the navigation system. For example, an illustrative modulating signal can be formed by CNAV data bits that are modulo-2 added (or otherwise encoded) to an approximately 1 MHz (e.g., 1.023 MHz) square-wave signal or subcarrier, for example. The PN code of the Data component is a ranging code for formation of a binary offset carrier BOC(1, 1) signal at a subcarrier frequency of approximately 1 MHz (e.g., 1.023 MHz). The BOC(1,1) signal is derived from a general modulating signal multiplied by the ranging code or data-component PN code, where the general modulating signal is based on a Manchester encoded (e.g., sine Manchester encoded) square wave at approximately 1 MHz (e.g., 1.023) that is modulo-2 added to any message data (e.g., CNAV data bits). For example, the ranging code may be derived from a unique length sequence with a common expansion sequence of known length inserted at pseudo-random noise signal number dependent point, where the ranging code has a chipping rate (e.g., of approximately 1.023 MHz).

The Pilot component is not modulated by any data bits, but is modulated by a different PN code than the data-component PN code (e.g., a pilot-component PN code that is generally orthogonal to data-component PN code used for the Data component to avoid interference). The PN code of the Pilot component is a ranging code modulated (e.g., alternately modulated) by the TMBOC(6,1,4/33) Manchester encoded square wave signal precursors at approximately 6 MHz (e.g., 6.138 MHz) and 1 MHz (e.g., 1.023 MHz).

Figure 4:
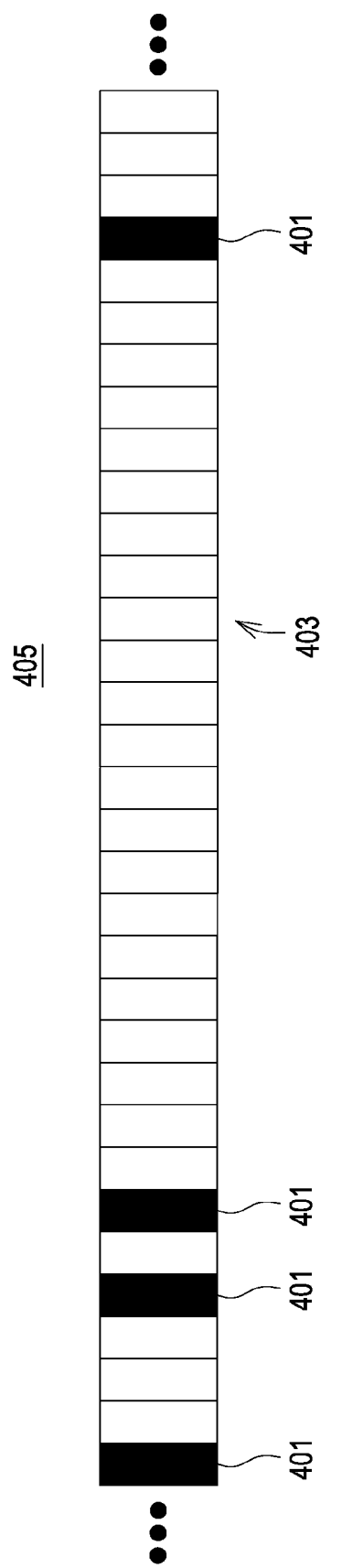
FIG. 4 provides an illustrative example of the modulation of the pilot component of a composite signal (e.g., L1C signal for a Global Positioning System).

FIG. 4 shows illustrative blocks of the multiplexed modulating signal 405 (e.g., at multiplexer output 76) associated with locally generated reference signal in accordance with one embodiment. For example, FIG. 4 provides an illustrative representation of the timing data 41 associated with the TMBOC signal in which 4 of 33 code chips are modulated by the 6.138 MHz BOC(6,1) Manchester-encoded square wave and the other 29 of 33 code chips are modulated by a 1.023 MHz BOC(1,1) Manchester-encoded square wave. As shown in FIG. 4, the dark-shaded blocks 401 represent the locations that contain the BOC(6,1) signal and the empty or light blocks 403 indicate the location of the BOC(1,1) signal. However, the dark-shaded blocks 401 may represent the non-dominant signal component in alternative embodiments, whereas the light-shaded blocks may represent dominant signal components of the multiplexed modulating signal 405. The multiplexed modulating signal 405 may be spread or multiplied by the ranging code as described in this document. The ranging code may be derived from a unique length sequence with a common expansion sequence of known length inserted at pseudo-random noise signal number dependent point, where the ranging code has a chipping rate (e.g., of approximately 1.023 MHz).

For the locally generated reference signal, a complete replica of the TMBOC (e.g., TMBOC(6,1,4/33)) signal used to modulate the L1C Pilot component is required to demodulate the received signal without any degradation of the received signal-to-noise ratio of the received composite signal (e.g., L1C signal or the Pilot component of the L1C signal). If the receiver code used to demodulate the Pilot component excises the BOC(6,1) code chips, such a reference code would also demodulate the Pilot component faithfully but would only experience approximately some signal-to-noise ratio loss (e.g., 0.56 dB loss of SNR) for the Pilot component. To excise the BOC(6,1) code chips requires knowledge of the location of the BOC(6,1) code chips. The specification of the L1C signal and the location of the BOC(6,1) code chips of the L1C signal are specified in IS-GPS-800A, which is entitled "Global Positioning System Directorate Systems Engineering & Integration Interface Specification IS-GPS-800, Naystar GPS Space Segment/User Segment L1C Interface," publication IS-GPS-800B, dated 21 Sep. 2011, available on-line at http://www.gps.gov/technical/icwg/IS-GPS-800B.pdf which is hereby incorporated by reference.

The receiver and method described in this document is well suited for at least partially decoding the composite signal or the multiplexed binary offset signal with minimal or nominal loss of performance (e.g., signal-to-noise ratio) in comparison to certain prior art receivers that fully decode the composite signal or the multiplexed binary offset signal. For example, the receiver and method described in this document is well suited for using less circuitry by elimination or deletion of a second signal generator (and supporting hardware) to provide a second signal representative of a non-dominant component (e.g., BOC(6,1) component) of the composite signal. Accordingly, the receiver and method described in this document can potentially consume less energy and can be less expensive to manufacture than that required for decoding fully the composite signal or the multiplexed binary offset signal.

Having described the preferred embodiment, it will become apparent that various modifications can be made without departing from the scope of the invention as defined in the accompanying claims. For example, one or more of any dependent claims set forth in this document may be combined with any independent claim to form any combination of features set forth in the appended claims, and such combination of features in the claims are hereby incorporated by reference into the specification of this document.

The following is claimed:

1. A receiver for receiving a composite signal, the receiver comprising:
   a receiver front-end for down-converting a received composite signal;
   an analog-to-digital converter for converting the downconverted signal to a received digital composite signal;
   a first signal generator for generating a first signal;
   a data storage device for providing a null code;
   a multiplexer for multiplexing the first signal and the null code consistent with a predetermined time sequence for expression of the null code in a produced precursor signal;
   a ranging code generator for generating a ranging code;
   a mixer accepting the ranging code and the precursor signal and outputting a locally generated reference signal;
   a code correlator for correlating the digital received composite signal to the locally generated reference signal to decode at least a first portion of the received composite signal, while leaving a second portion of the received composite signal undecoded; and
   a tracking loop signal processor to process the received digital composite signal via a time delay module to maximize correlation of the digital received composite signal to the locally generated reference signal.

2. The receiver according to claim 1 wherein the received composite signal comprises a multiplexed binary offset carrier (MBOC) or a time multiplexed binary offset carrier (TM-BOC) signal and wherein the predetermined time sequence is based on the time slots that a particular binary offset carrier signal component of the MBOC signal is expressed in the MBOC signal.

3. The receiver according to claim 1 wherein the received composite signal comprises a multiplexed binary offset carrier (MBOC) or a time multiplexed binary offset carrier (TM-BOC) signal and wherein the predetermined time sequence is based on the time slots that a MBOC (6,1) signal is expressed in the MBOC signal.

4. The receiver according to claim 1 further comprising:
   a controller for controlling the selection of time slots provided to multiplexer input terminals of the multiplexer based on reference to the predetermined time sequence to produce, at the multiplexer output terminal, a precursor signal of a modified BOC (1,1) modified such that a minority fraction of the precursor of the BOC (1,1) has null codes.

5. The receiver according to claim 1 wherein the data storage device comprises one or more of the following: a latch, a register, a flip-flop, electronic memory, or nonvolatile electronic memory.

6. The receiver according to claim 1 wherein the null code comprises a voltage at or approaching zero volts and wherein the first signal has a maximum positive amplitude and a maximum negative amplitude such that the maximum positive amplitude is associated with a first logic level and the maximum negative amplitude is associated with a second logic level that is the opposite of the first logic level.

7. The receiver according to claim 1 wherein the received composite signal comprises a multiplexed binary offset carrier (MBOC) signal composed of a binary offset carrier (BOC) (1,1) signal component, and a BOC (6,1) signal component, and wherein the first signal comprises a signal precursor of a BOC (1,1) signal.

8. The receiver according to claim 1 wherein the received composite signal comprises a multiplexed binary offset carrier (MBOC) signal composed of a binary offset carrier (BOC) (1,1) signal component, and a BOC (6,1) signal component, and wherein the locally generated reference signal comprises a modified BOC (1,1) modified such that a minority fraction of the precursor of the BOC (1,1) has null codes.

9. The receiver according to claim 1 wherein the first signal generator comprises a first square wave generator for generating a first signal at a first frequency.

10. The receiver according to claim 1 wherein the first signal generator comprises a sinusoidal wave generator for generating a Sin BOC (1,1) signal precursor.

11. The receiver according to claim 1 wherein the code correlator correlates the digital composite signal to the locally generated signal to demodulate the ranging code.

12. The receiver according to claim 1 wherein the code correlator correlates the digital composite signal to the locally generated signal to identify edge transitions for tracking the carrier phase of the of the received composite signal.

13. The receiver according to claim 1 wherein the received composite signal comprises a multiplexed binary offset carrier (MBOC) signal, where a first portion of the received composite signal comprises a first binary offset carrier (BOC) (n,m) signal component, where a second portion of the received composite signal comprises a second binary offset carrier (BOC) (o,p) signal component, where n, m, o and p are integer values, and where the locally generated reference signal is associated with a modified BOC (n,m) signal component that is temporally dominant in a majority of the time slots of the MBOC signal, the modified BOC signal component having null codes inserted in certain time slots associated with the second BOC signal component.

14. A method for receiving a binary offset carrier signal, the method comprising:
   down-converting a received composite signal;
   converting the down-converted composite signal to a digital received composite signal;
   generating a first signal;
   providing a null code;
   multiplexing the first signal and the null code consistent with a predetermined time sequence for expression of the null code in a produced precursor signal;
   generating a ranging code;
   accepting the ranging code and the produced precursor signal and outputting a locally generated reference signal;
   correlating the digital received composite signal to the locally generated reference signal to decode at least a first portion of the received composite signal, while leaving a second portion of the received composite signal undecoded; and
   processing the received digital composite signal via a time delay module to maximize correlation of the digital received composite signal to the locally generated reference signal.

15. The method according to claim 14 wherein the received composite signal comprises a multiplexed binary offset carrier (MBOC) or a time multiplexed binary offset carrier (TM-BOC) signal and wherein the predetermined time sequence is based on the time slots that a particular binary offset carrier signal component of the MBOC signal is expressed in the MBOC signal.

16. The method according to claim 14 wherein the received composite signal comprises a multiplexed binary offset carrier (MBOC) or a time multiplexed binary offset carrier (TM-BOC) signal and wherein the predetermined time sequence is based on the time slots that a MBOC (6,1) signal is expressed in the MBOC signal.

17. The method according to claim 14 further comprising: controlling the selection of time slots provided to multiplexer input terminals of a multiplexer based on reference to the predetermined time sequence to produce, at the multiplexer output terminal, a precursor signal of a modified BOC (1,1) modified such that a minority fraction of the precursor of the BOC (1,1) has null codes.

18. The method according to claim 14 wherein the providing of a null code comprises providing a null code by a data storage device.

19. The method according to claim 14 wherein the null code comprises a voltage at or approaching zero volts and wherein the first signal has a maximum positive amplitude and a maximum negative amplitude such that the maximum positive amplitude is associated with a first logic level and the maximum negative amplitude is associated with a second logic level that is the opposite of the first logic level.

20. The method according to claim 14 wherein the received composite signal comprises a multiplexed binary offset carrier (MBOC) signal composed of a binary offset carrier (BOC) (1,1) signal component, and a BOC (6,1) signal component, and wherein the first signal comprises a signal precursor of a BOC (1,1) signal.

21. The method according to claim 14 wherein the received composite signal comprises a multiplexed binary offset carrier (MBOC) signal composed of a binary offset carrier (BOC) (1,1) signal component, and a BOC (6,1) signal component, and wherein the locally generated reference signal comprises a modified BOC (1,1) modified such that a minority fraction of the precursor of the BOC (1,1) has null codes.

22. The method according to claim 14 wherein the generating of the first signal comprises generating a first signal by a first square wave generator for generating a first signal at a first frequency.

23. The method according to claim 14 wherein the first signal comprises a sinusoidal waveform such as a Sin BOC (1,1) signal precursor.

24. The method according to claim 14 wherein the correlating comprises correlating the digital composite signal to the locally generated signal to demodulate the ranging code.

25. The method according to claim 14 wherein the correlating comprises correlating the digital composite signal to the locally generated signal to identify edge transitions for tracking the carrier phase of the of the received composite signal.

26. The method according to claim 14 wherein the received composite signal comprises a multiplexed binary offset carrier (MBOC) signal, where a first portion of the received composite signal comprises a first binary offset carrier (BOC) (n,m) signal component, where a second portion of the received composite signal comprises a second binary offset carrier (BOC) (o,p) signal component, where n, m, o and p are integer values, and where the locally generated reference signal is associated with a modified BOC (n,m) signal component that is temporally dominant in a majority of the time slots of the MBOC signal, the modified BOC signal component having null codes inserted in certain time slots associated with the second BOC signal component.

27. The method according to claim 14 wherein the processing comprises:
shifting an adjustable time delay of the locally generated reference signal with respect to the digital received composite signal via a time delay module based on maximizing correlation of the received composite signal to the locally generated reference signal.

* * * * *